T. J. Mayall,
Razor Strop.

Nº 27,301. Patented Feb. 28, 1860.

Witnesses:
A. W. Brown
Joseph Gavett

Inventor:
Tho. J. Mayall

UNITED STATES PATENT OFFICE.

THOMAS J. MAYALL, OF ROXBURY, MASSACHUSETTS.

RAZOR-STROP.

Specification of Letters Patent No. 27,301, dated February 28, 1860.

*To all whom it may concern:*

Be it known that I, THOMAS J. MAYALL, of Roxbury, in the county of Norfolk and State of Massachusetts, have invented certain new and useful Improvements in the Manufacture of Razor-Strops, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The figures of the accompanying plate of drawings represent my improvements.

Figure 1:
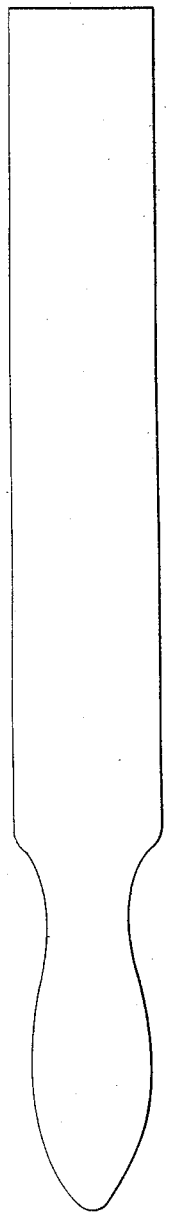
Figure 2:
Figure 3:
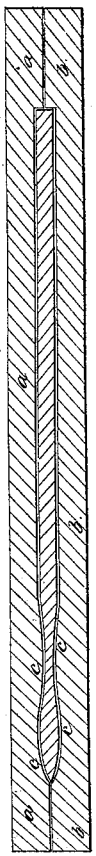
Figure 4:
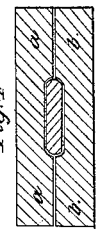

Figure 1 is a plan or top view of my new razor-strop. Fig. 2 is a central longitudinal vertical section of the same. Figs. 3 and 4 are sectional views on a reduced scale, of the molds.

The object of my improvements is to form a razor-strop which shall be cheaper and more durable than those heretofore manufactured. I effect these results by making the razor-strop of india rubber or gutta-percha or of a composition of either with other articles and form the razor-strop, as I will now describe. To make the hone side of the strop I make a composition of about the following proportions, viz:—15 lbs. of fine emery or other fine gritty substance, 1 lb. of rubber or gutta percha and 5 oz. of sulfur. To these may be added, if desired, 1 oz. of olive oil, as it gives adhesiveness to the composition. These ingredients are properly combined and mixed together and the composition thus formed is then placed in either half of a metallic mold *a a b b*. I then form the soft or finishing side of the strop as follows: I take 8 lbs. of rubber or gutta percha, 3 lbs. of fine black lead, 2 lbs. of French clay, 3 oz. of olive oil and ½ lb. of sulfur. These are mixed thoroughly together and placed in the other half of the mold. The handle I prefer to form of hard gum compound, say 1 lb. of rubber or gutta percha and ½ lb. of sulfur ground together and placed in that portion of the molds *a a b b* marked *c* in the drawings. The whole is then subjected to pressure in the molds and heated any desired length of time at a temperature from 260° to 300° Fahrenheit.

There are of course a variety of modes in which the strop can be formed, but I prefer the one above described, and the compositions above stated and the degrees of heat to be employed also admit of many modifications and therefore I do not limit myself to the proportions named or to the degree of heat to be employed.

It will be evident that by varying the forms of the molds that the strop can be made of any desired number of sides, and that the strop instead of being wholly constituted of rubber or gutta percha compositions may have its inner body and handle composed of wood, metal or other materials, with its hone and soft surfaces composed of the above described compositions, made into sheets, and attached thereto in any proper manner.

Having thus described my improvements I shall state my claims as follows:

What I claim as my invention and desire to have secured to me by Letters Patent is—

As a new article of manufacture is an india rubber or gutta percha razor strop, the hone side of which is formed of emery sand or other suitable gritty substance or substances, incorporated with india rubber or gutta percha substantially as described.

THOS. J. MAYALL.

Witnesses:
 JOSEPH GAVETT,
 A. W. BROWN.